H. B. Murphy.
Meat Cutter.
No. 111,670.  Patented Feb. 7, 1871.

Witnesses.
Geo. Thomas
L. C. Thomas

Inventor.
Hugh B. Murphy
J. J. Johnston his Attorney

United States Patent Office.

HUGH B. MURPHY, OF ALLEGHENY CITY, PENNSYLVANIA.

Letters Patent No. 111,670, dated February 7, 1871.

IMPROVEMENT IN MEAT-CUTTERS.

The Schedule referred to in these Letters Patent and making part of the same.

To all whom it may concern:

Be it known that I, HUGH B. MURPHY, of the city and county of Allegheny and State of Pennsylvania, have invented a new and useful Improvement in Meat-Cutter; and I do hereby declare that the following is a full, clear, and exact description thereof, reference being had to the accompanying drawing and to the letters of reference marked thereon.

The nature of my invention consists in the combination and arrangement of a revolving cutter-block, cutters provided with adjustable weights, and the operating mechanism for the said revolving block and the cutters.

To enable others skilled in the art to make and use my invention I will proceed to describe its construction and operation.

In the accompanying drawing, which forms part of my specification—

In the accompanying drawing—

A represents the frame of the meat-cutting machine.

B represents the revolving cutter-block, which is pivoted on the cross-bar C.

Around the upper side of the projecting flange D of the cutter-block B are ratchet-teeth, e, into which drops the end of a pawl or lever, f, which is pivoted on a crank, h, of the shaft i, which is provided with a series of lifters, k, which are arranged on the shaft i spirally.

The levers l are pivoted on the shaft m, and are provided each with an adjustable weight, n, near the front end of each of the levers l.

Near the front end of each of the levers l is secured a cutter, J.

Figure 1:
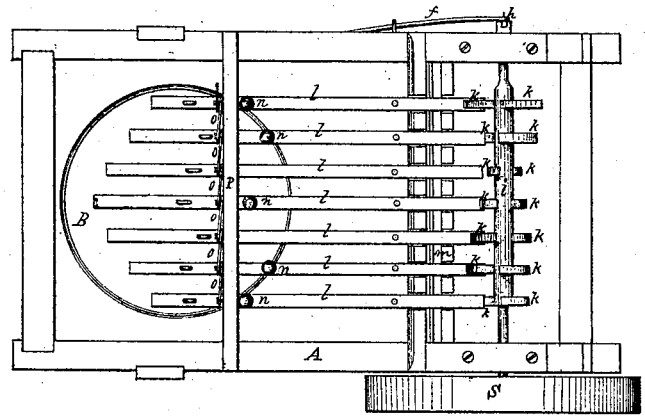
Figure 1 is a top view or plan of my improved meat-cutter.
Figure 2:
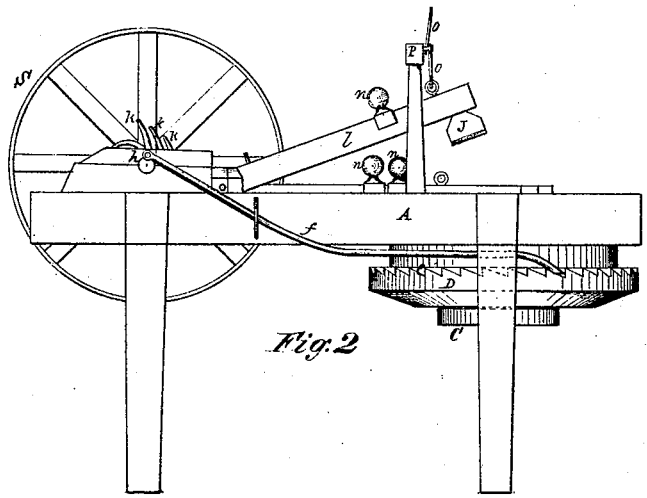
Figure 2 is a side elevation of the same.
Figure 3:
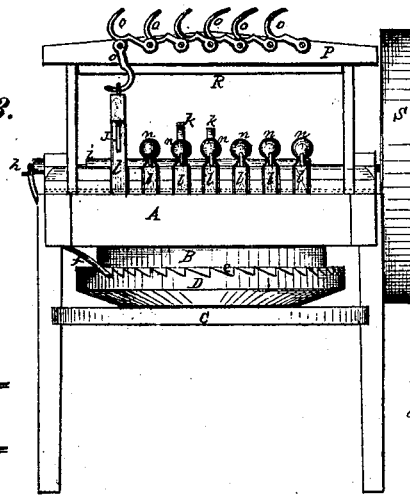
Figure 3 is an end elevation of the same.

On the upper side of the levers l are staples, which are used in combination with the hooks o secured to the cross-bar P, for the purpose of suspending the levers l with their cutters, as indicated in figs. 2 and 3, in which one of the levers is represented suspended.

On the under side of the cross-bar P is secured a gum spring, R, which is used for imparting a quick return of the levers and their cutters to the cutting-block.

S represents the driving-pulley or wheel.

As the construction and arrangement of the several parts of my improvement and the relation that the several parts bear to each other will be readily understood from the foregoing description and by reference to the accompanying drawing, I will therefore proceed to describe the operation, which is as follows:

The meat is placed on the block B and under the cutters J. Power is then applied to the wheel S, and the revolving of it will revolve the shaft i, which will bring the lifters k in contact with the back ends of the levers l, causing them to rise up one after another and strike against the gum spring R, which will cause the levers with their cutters to fall with a quick motion, and the cutters J coming in contact with the meat will cut through it, and the revolving of the crank h will impart a reciprocating motion to lever f in connection with the teeth e on the flange D will give to the cutter-block B a slow rotating motion, thereby bringing all parts of the meat under the cutters J.

The adjustable weights are used in combination with levers l for giving force to the stroke of the cutters J. The nearer the weights are to the front ends of the levers l the greater will be the force of the stroke of the cutters.

Having thus described the nature, construction, and operation of my improvement,

What I claim as of my invention is—

The combination and arrangement of the revolving cutter-block B with ratchet-teeth e, pawl or lever f, crank h, shaft i provided with lifters k, levers l provided with cutters J and adjustable weights n, and the gum spring R, the whole being constructed, arranged, and operating substantially as herein described, and for the purpose set forth.

HUGH B. MURPHY.

Witnesses:
A. C. JOHNSTON,
JAS. G. THOMPSON